Nov. 15, 1932.  J. J. TATUM  1,887,605
ANTIFRICTION ROLLER SIDE BEARING FOR RAILROAD CARS
Filed July 2, 1929  2 Sheets-Sheet 1
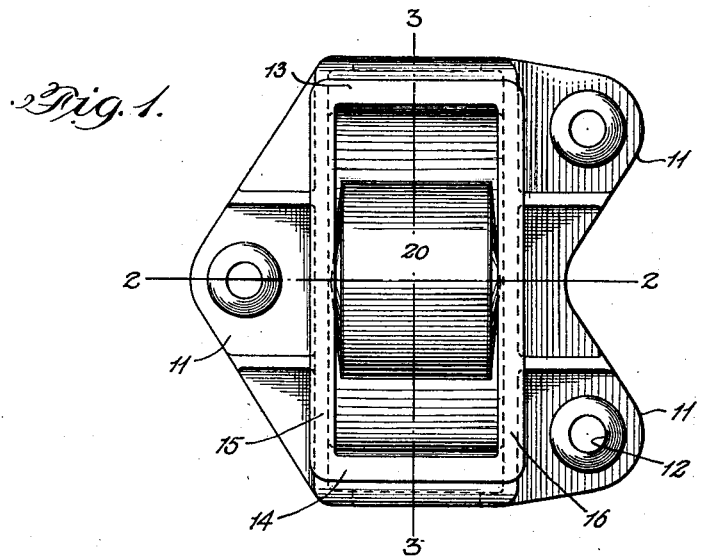
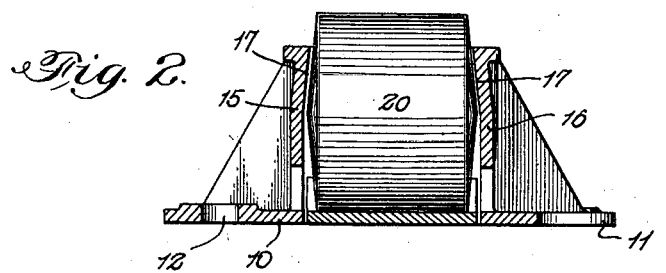
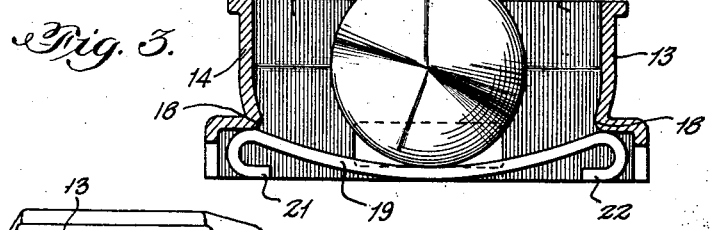
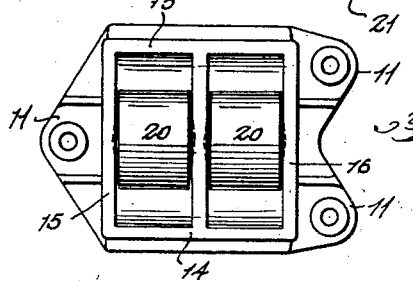

Nov. 15, 1932. J. J. TATUM 1,887,605
ANTIFRICTION ROLLER SIDE BEARING FOR RAILROAD CARS
Filed July 2, 1929 2 Sheets-Sheet 2

Inventor
John J Tatum
By Edwin S Clarkson
Attorney

Patented Nov. 15, 1932

1,887,605

UNITED STATES PATENT OFFICE

JOHN J. TATUM, OF BALTIMORE, MARYLAND

ANTIFRICTION ROLLER SIDE BEARING FOR RAILROAD CARS

Application filed July 2, 1929. Serial No. 375,551.

In the drawings:

Figure 1 is a top plan view of a side bearing embodying my invention.

Figure 2 is a sectional view on the line 2—2, Figure 1.

Figure 3 is a sectional view on the line 3—3, Figure 1.

Figure 8 is a top plan view of a double side bearing embodying my invention. Figure 9 is a fragmentary longitudinal section showing a modified raceway.

Figure 4:
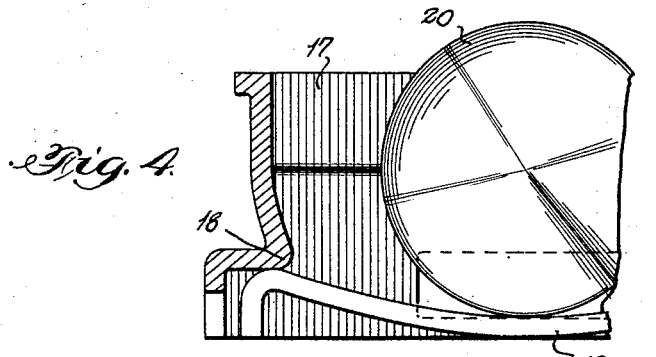
Figures 4, 5 and 6 are enlarged detail sectional views showing slightly modified raceways.

In the side bearing heretofore commonly in use prior to my invention the ends of the roller are at right angles to its axis, which results, when the roller becomes slightly tangent to the side walls of the bearing (which happens in service when they get into an angular position as the cars are curving), in the edges of the roller cutting into the housing, thereby damaging the housing and impairing the proper functioning of the side bearing in that the free movement of the rollers is retarded.

One of the objects of my invention is to provide a roller for a side bearing which has a greater width along the line of its axis than at its periphery, and a complemental housing, thereby eliminating the possibility of the roller becoming unduly displaced or dislodged from the housing from any cause.

Another object of my invention is to provide a side bearing for cars of such construction that the roller cannot be released from the housing until the housing is released from the car or truck to which it may be attached.

Another object of my invention is to provide a side bearing that can be attached to the truck bolster of the car, or to the body bolster; and with these, and other objects in view my invention consists of the parts and combination of parts as will be hereinafter set forth.

The reference numeral 10 designates the housing of my improved side bearing having attaching lugs 11 provided with suitable bolt, or screw openings 12. The housing is provided with upstanding end walls 13, 14, and side walls 15, 16. The inside faces of the walls 15, 16, converge toward each other from a point substantially on a line with the axis of the roller in the housing, to the upper edges of the walls as indicated at 17, and on an angle parallel with the bevelled ends of the rollers, one of the objects of which is that when the bearing is in position on the car structure it is impossible for the roller to be released through the top of the housing.

The end walls 13, 14, of the housing are, preferably, deflected inwardly at the bottom at 18 to form a stop to limit the upward movement of the spring raceway 19 to be hereinafter referred to. This formation of stop 18 is shown because of its easy formation in a casting, but, of course, any other form of stop may be employed without departing from my invention.

Figure 7:
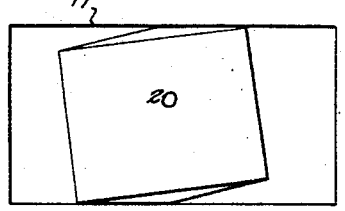
Figure 7 is a diagrammatic view of my improved side bearing.

The roller 20 is made of hardened metal of the required strength to carry the load suitably to the capacity of the car it is to be used under. The roller has short or shallow cone shaped ends so that the roller has a greater width through its central zone than that of the rolling surface whereby the roller cannot slip out of, or be removed from the housing after the housing is secured in position. Another object of forming the ends of the roller substantially cone shaped is that when a car is curving and the roller is forced to move in a triangular position (see Figure 7) in the housing, it insures a flat surface bearing up against the sides 15, 16 (17) of the housing, thereby preventing wear or cutting from the edge of the roller as would occur under like conditions in the use of a roller with straight (flat) ends. This insures longer life for the sides of the housing and prevents the roller from cutting into the sides of the housing, and provides free movement of the roller in the housing, besides which it eliminates retardation of the free movement of the roller in the housing.

The raceway 19 on which the roller 20 moves is arcuate, insuring the roller always automatically finding the center of the housing. This raceway is made of spring steel, and the ends 21, 22, are bent under and back toward the center of the housing. The object of this bending the ends 21, 22, is to provide a spring resistance, so that as the roller 20 rolls up toward the end of the raceway, the raceway is compressed, as a spring would compress with a load upon it. The instant the load is released from the roller the raceway springs forward and returns to its normal position quickly throwing the roller back to its normal or central position in the housing. It also prevents the raceway from rocking on its center.

In the use of my improved anti-friction side bearing for railroad cars, I am enabled to eliminate the troubles experienced with the side bearings heretofore commonly in use by:

First: spring action of the raceway forcing promptly back to central location the roller in its central position when released from its load.

Second: by providing a roller in a housing having means to prevent loss of the roller from the housing.

Third: by providing the roller with substantially cone shaped ends, thus insuring a broad flat surface riding against the sides of the housing when the roller is forced to an angular position as the car is curving, insuring longer life of the housing and a freer movement of the roller in the housing.

Of course, it will be understood that I may provide the bearing with a plurality of rollers as shown in Figure 8.

Figure 5:
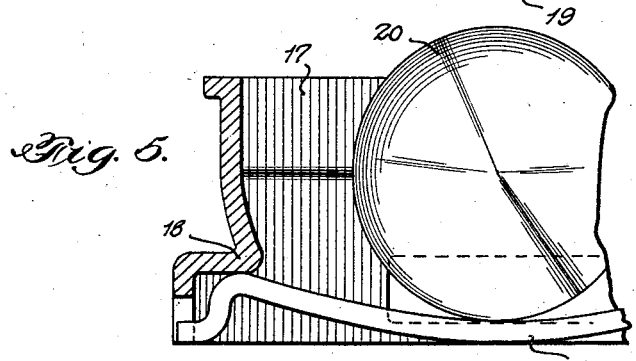
Figure 6:
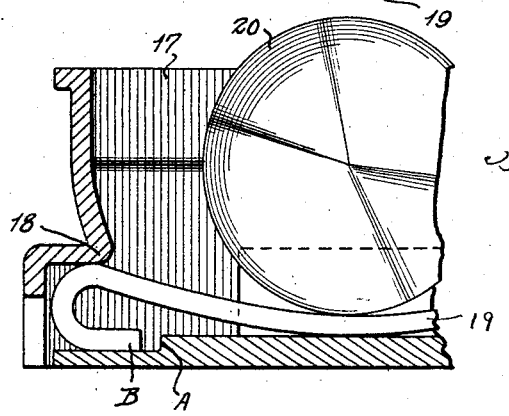

In Figures 4 and 5 I show the spring raceway end formed in different bends, while in Figure 6 I show a stop A which may be used to limit the inward movement of the end B of the raceway, which stop may be on the bolster but is preferably formed on a bed plate removably fitted in the bottom of the housing and forming a direct support for the raceway.

In Figure 9 I show a raceway 23 formed of solid rubber of proper shape to fit in the housing. This raceway has its upper face 24 concaved, as shown, for the roller to roll upon. The purpose of a solid rubber raceway is to deaden the sound of the roller when used in connection with passenger equipment cars, and thereby prevent metallic sounds from annoying the occupants of the car. The resiliency of this rubber raceway is such as to insure the return of the roller to its normal central position when the load is released from the roller.

The housing is provided with suitable openings to clear itself of water, snow, ice and other foreign matter that would affect the free movement of the roller in the housing. In some instances I may prefer to make the roller of rubber.

It will be seen that the upper inclined or tapering portions 17 of walls 15 and 16, which conform to the taper of the shallow conoidal ends of the rollers, make the bearing chamber of the housing of less width than the greatest cross-sectional area of the roller in the direction of its axis, whereby the upward displacement of the roller beyond proper bearing position or its ejection from the chamber at the top thereof is prevented, while, as the lower portions of the walls 15 and 16 are uniformly spaced to a degree greater than the major length of the roller, the roller may be withdrawn from the chamber and reapplied without interference and with great facility whenever the open bottom of the housing is not closed or covered. This provides a ready and convenient means of assembling and disassembling parts in a side bearing using a unitary housing structure, and in many cases may permit removal of a worn roller and application of a new one without removing the housing itself from the car.

I am aware that changes may be made in the details of construction without departing from the spirit of my invention, and the scope of the appended claims.

What I claim is:

1. In an anti-friction side bearing for cars, a housing open at top and bottom and having side and end walls, the lower portions of the side walls being uniformly spaced and the upper portion of said side walls converging toward each other.

2. In an anti-friction side bearing, the combination with a housing having side and end walls, a roller in said housing having bevelled ends, a flat spring raceway in said housing for said roller, and a stop in said housing for said spring raceway.

3. In an anti-friction side bearing, the combination of a housing having a bearing chamber comprising side and end walls and open at top and bottom, the lower portions of said side walls being uniformly spaced and the upper portion of said side walls converging toward each other upwardly, a roller having substantially cone shaped ends for engagement with the converging portions of the side walls, a resilient raceway for the roller in said housing, and a stop in the housing for said raceway.

4. In an anti-friction side bearing for cars, a housing having a bearing chamber open at bottom and top and comprising side and end walls, and a roller disposed in said chamber, said side walls of the chamber being provided with bearing faces for the roller converging toward the open top of the chamber.

5. In an anti-friction side bearing, a roller having shallow conoidal ends, and a housing open at top and bottom and having side walls provided with plane surfaced upper portions converging toward the open top of the housing to form bearings for the ends of the roller and stops to prevent upward movement of the roller beyond a predetermined position and relatively formed and disposed at their lower ends to permit insertion and removal of the roller at the bottom of the housing.

6. In an anti-friction side bearing, a roller having bevelled ends, and a housing open at top and bottom and having side walls which at their upper ends are beveled complementarily to and arranged for bearing engagement with the ends of the roller and which at their lower ends are spaced a greater distance apart than the distance between the ends of the roller.

7. In an anti-friction side bearing, a roller having short or shallow conoidal ends, and a housing having side walls which at their upper ends converge upwardly on lines conforming complementarily to the taper of the ends of the roller and the lower ends of which are spaced apart a distance greater than the distance between the ends of the roller.

8. A raceway for a bearing roller comprising a chamber having an open base of greater length than the chamber and having its end walls provided with offsets forming shouldered sockets in open communication with the ends of said open base, a roller in the upper portion of said chamber, and a cushioning member forming a closure for said open bottom and a support for the roller adapted to be elastically compressed by the roller under load thereon, said member having end portions enclosed in said sockets and bearing against the shoulders thereof.

In testimony whereof I affix my signature.

JOHN J. TATUM.